(12) United States Patent
Filipovic et al.

(10) Patent No.: US 8,391,345 B2
(45) Date of Patent: Mar. 5, 2013

(54) POWER SPECTRAL DISTRIBUTION MEASUREMENT TO FACILITATE SYSTEM ACQUISITION

(75) Inventors: Daniel F. Filipovic, San Diego, CA (US); Jifeng Geng, San Diego, CA (US); Cristina A. Seibert, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 12/579,177

(22) Filed: Oct. 14, 2009

(65) Prior Publication Data

US 2011/0085589 A1 Apr. 14, 2011

(51) Int. Cl.
*H04B 3/46* (2006.01)

(52) U.S. Cl. ........ 375/224; 375/223; 375/286; 375/287; 375/316; 375/322; 370/332; 370/480; 455/67.11; 455/67.13; 455/434

(58) Field of Classification Search .................. 375/136, 375/147, 150, 219, 223, 224, 229, 261, 268, 375/271, 273, 286, 287, 294, 316, 317, 322, 375/340, 343
See application file for complete search history.

(56) References Cited

U.S. PATENT DOCUMENTS

| | | | | |
|---|---|---|---|---|
| 6,804,262 B1* | 10/2004 | Vogel et al. | ................... | 370/480 |
| 7,428,270 B1* | 9/2008 | Dubuc et al. | ................... | 375/316 |
| 7,653,152 B2* | 1/2010 | Al-Eidan | ...................... | 375/334 |
| 7,885,352 B2* | 2/2011 | Yuan et al. | ..................... | 375/296 |
| 8,019,290 B2* | 9/2011 | Mak et al. | ....................... | 455/91 |
| 8,295,395 B2* | 10/2012 | Mueck et al. | ................. | 375/296 |
| 2003/0231605 A1* | 12/2003 | Amerga et al. | ............... | 370/332 |
| 2009/0131047 A1* | 5/2009 | Amerga et al. | ............... | 455/434 |
| 2010/0035557 A1* | 2/2010 | Shellhammer | ............. | 455/67.11 |
| 2011/0263211 A1* | 10/2011 | Perthold et al. | ............ | 455/67.13 |

FOREIGN PATENT DOCUMENTS

| WO | WO2008153553 A1 | 12/2008 |
|---|---|---|
| WO | WO2009039211 | 3/2009 |

OTHER PUBLICATIONS

International Search Report and Written Opinion—PCT/US2010/052753, ISA/EPO—Sep. 8, 2011.
Ng Y H et al., "Carrier Tracking Technique for OFDM Signal Transmissions", Electronics Letters, IEE Stevenage, GB, vol. 32, No. 22, Oct. 24, 1996, pp. 2047-2048, XP006005868, ISSN: 0013-5194, DOI: 10.1049/EL:19961361.
Ning Han et al., "Spectral Correlation Based Signal Detection Method for Spectrum Sensing in IEEE 802.22 WRAN Systems", International Conference on Advanced Communication Technology, XX, XX, vol. 8th, Feb. 20, 2006, pp. 1765-1770, XP002467424.

(Continued)

*Primary Examiner* — Hirdepal Singh
(74) *Attorney, Agent, or Firm* — Jiayu Xu; Eric Ho

(57) ABSTRACT

Wireless devices and techniques providing improved system acquisition in an environment of multiple co-existing technologies over a common frequency band are disclosed. In one aspect, at a remote terminal, a power spectral distribution (PSD) of received signals is sequentially measured in contiguous segments of a frequency band of interest. One or more characteristics of the measured PSD is compared to at least one predetermined metric to identify the presence or absence of at least one technology type of the received signals in frequency locations across the band. A system acquisition operation is performed in accordance with the identification, such as a tailored scan of channels at locations where a desired technology is identified.

38 Claims, 9 Drawing Sheets

OTHER PUBLICATIONS

Welch P D, "The Use of Fast Fourier Transform for the Estimation of Power Spectra: A Method Based on Time Averaging over Short, Modified Periodograms", IEEE Transactions on Audio and Electroacoustics, IEEE Inc. New York, US, vol. AU-15, No. 2, Jun. 1, 1967, pp. 70-73, XP002586039, ISSN: 0018-9278.

Xian Ming Li et al., "A Difference Method of the Gravity Center With Double Pilots for the Mc-CDMA System", Circuits and Systems, 2000, IEEE APCCAS 2000, the 2000 IEEE Asia-Pacific Conference on Dec. 4-6, 2000, Piscataway, NJ, USA.IEEE, Piscataway, NJ, Dec. 4, 2000, XP010537538, ISBN: 978-0-7803-6253-6.

* cited by examiner

POWER SPECTRAL DISTRIBUTION MEASUREMENT TO FACILITATE SYSTEM ACQUISITION

TECHNICAL FIELD

The present disclosure relates generally to wireless communications, and more particularly, to devices and techniques used in a remote terminal receiver.

BACKGROUND

Wireless communication networks are widely deployed to provide various communication services such as voice, packet data, broadcast, and messaging. These wireless networks are typically capable of supporting communication for multiple users by sharing the available network resources. With today's networks, a number of different technologies (protocols) are employed for coding, processing, modulating and otherwise conditioning the communications signals. These technologies include but are not limited to: Global System for Mobile Communications (GSM); Code Division Multiple Access (CDMA); Wideband Code Division Multiple Access (WCDMA); and Long Term Evolution (LTE). To take advantage of the various network deployments, multi-mode phones have been developed with capability to communicate on two or more incompatible technologies.

Because of the limited frequency spectrum allocated for commercial communications on the current wireless networks, some of these technologies transmit and/or receive over the same frequency band in common geographical locations. As more technologies co-exist in the same band and multi-mode phones become more popular, initial acquisition becomes more and more challenging and time consuming for a specific technology. At the subscriber terminal (User Equipment or "UE"), acquisition failure (i.e., failure to establish communication on an available channel) has been become more common due to interference from other co-existing technologies. Each technology is limited by its own receiver (RX) front end in terms of bandwidth and dynamic range.

When a UE is first powered on and service information from the network is unavailable or invalid, the UE normally scans all of the valid carrier frequencies (or channels) in its network to attempt system acquisition via one of those carriers. Typically, it senses the raw power for each channel and makes a decision, based on a power threshold, whether to proceed with a full acquisition or to ignore that channel. For the Universal Mobile Telecommunications System (UMTS) Personal Communication Service (PCS) band, which has a 60 MHz bandwidth and a channel raster (spacing between adjacent carrier frequencies) of 200 kHz, the UE would search over 300 channels in the acquisition attempt. Because a power measurement carries no information on the underlying modulation, processing time and battery current are often wasted on attempts to acquire on irrelevant technologies.

Recently, there have been instances of GSM users reporting acquisition failure due to strong CDMA channels co-existing in the same band, even though there were strong GSM channels available. CDMA users have also reported acquisition issues due to confusion caused by GSM channels. As the spectrum becomes more crowded, the interference caused by other technologies will only get worse. Therefore, a need exists to mitigate the deleterious effects of such interference.

SUMMARY

Devices and methods for improving system acquisition in an environment of co-existing technologies over a common frequency band are disclosed. In one aspect, at a remote terminal, a power spectral distribution (PSD) of received signals is sequentially measured in contiguous segments of a frequency band of interest.

One or more characteristics of the measured PSD is compared to at least one predetermined metric to identify the presence or absence of at least one technology type of the received signals in frequency locations across the band. A system acquisition operation is performed in accordance with the identification. The system acquisition may involve, e.g., a tailored scan of channels at locations where a desired technology is identified; or, refraining from scanning channels where an incompatible technology is dominant.

In another aspect, a PSD of received signals is measured within a frequency band of interest; and a plurality of characteristics of the measured PSD are compared to a respective plurality of predetermined metrics to identify at least one technology type of the received signals in locations across the band. A system acquisition operation is performed in accordance with the identification. In this and other aspects, a prioritized ranking may be assigned to the respective technologies, whereby technologies dominating respective portions of the band can be identified and system acquisition operations tailored accordingly.

In the disclosure, embodiments of devices and methods employing a power scan algorithm are disclosed, which take advantage of existing hardware in a remote terminal receiver to obtain a snapshot of the power spectrum for an entire band of interest. The embodiments apply PSD characteristic(s) comparison or pattern matching in the frequency domain to quickly identify underlying technologies within the signals received by a UE. Other time domain techniques in accordance with the disclosure may be combined with frequency domain pattern matching to extract even more precise information.

DETAILED DESCRIPTION

The detailed description set forth below in connection with the appended drawings is intended as a description of exemplary embodiments of the present invention and is not intended to represent the only embodiments in which the present invention can be practiced.

The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1:
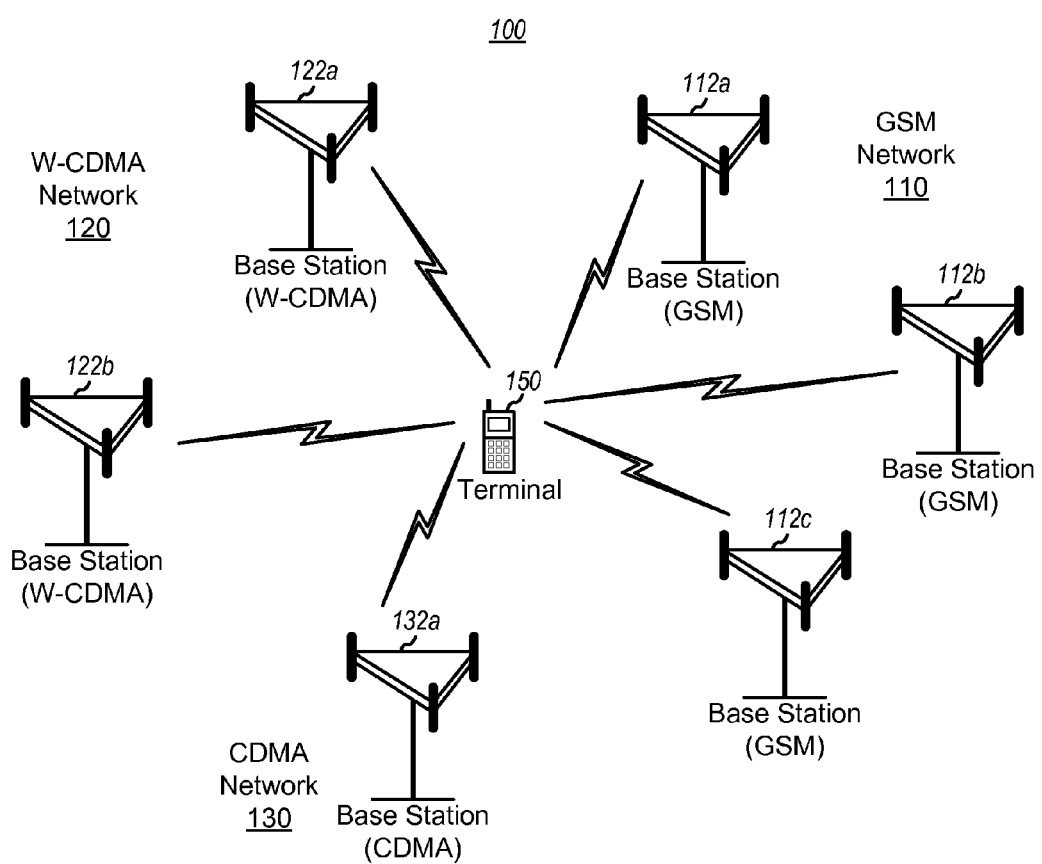
FIG. 1 is a diagram illustrating a terminal in a multiple technology wireless communications system.

FIG. 1 is a diagram illustrating a remote terminal 150 in a multiple technology wireless communications system. Terminal 150 is used for communicating with other remote terminals using, e.g., receive and/or transmit signals representing voice or data. Terminal 150 may be fixed or mobile and may also be called a user equipment device (UE), a mobile station (MS), a mobile equipment (ME), and so on. Terminal 150 may be a cellular phone, a laptop computer, a personal digital assistant, a wireless communication device, a subscriber unit, a "netbook" type device, and so on. Terminal 150 may be a single mode terminal configured to operate only in a single wireless technology such as CDMA2000, WCDMA or GSM. Terminal 150 can also be a multi-mode terminal configured to operate in two or more wireless technologies. Base stations of different wireless communications technologies may transmit signals to common locations within system. For instance, a GSM network 110 having base stations 112a-112c; a WCDMA network 120 with base stations 122a, 122b; and a portion of a CDMA network 130 with base station 132a may be located in geographical proximity to one another. Each of these base stations may be capable of communicating with terminal 150 if the latter is equipped with all of the appropriate technologies. In well managed system designs, base stations of differing technologies in close geographical vicinity to one another will not transmit on the same frequency channels to avoid interference problems.

Accordingly, if terminal 150 is a single mode terminal operating only with WCDMA capability, for example, it is desired to establish communication in a frequency channel that is not dominated by GSM or CDMA signal energy at the terminal's location. Additionally, it is undesirable to expend time and energy searching for a frequency channel on which to acquire a system, only to fail to acquire as the frequency channel carries signals of an incompatible technology.

If terminal 150 is a multi-mode terminal, it is desirable to acquire a system of suitable technology in the shortest time possible. In accordance with the disclosure, by performing a power scan and pattern match operation across an entire frequency band of interest (or a significant portion thereof) in a relatively short time frame, the frequency channels that best support the desired technology or technologies can be discerned.

Figure 2:
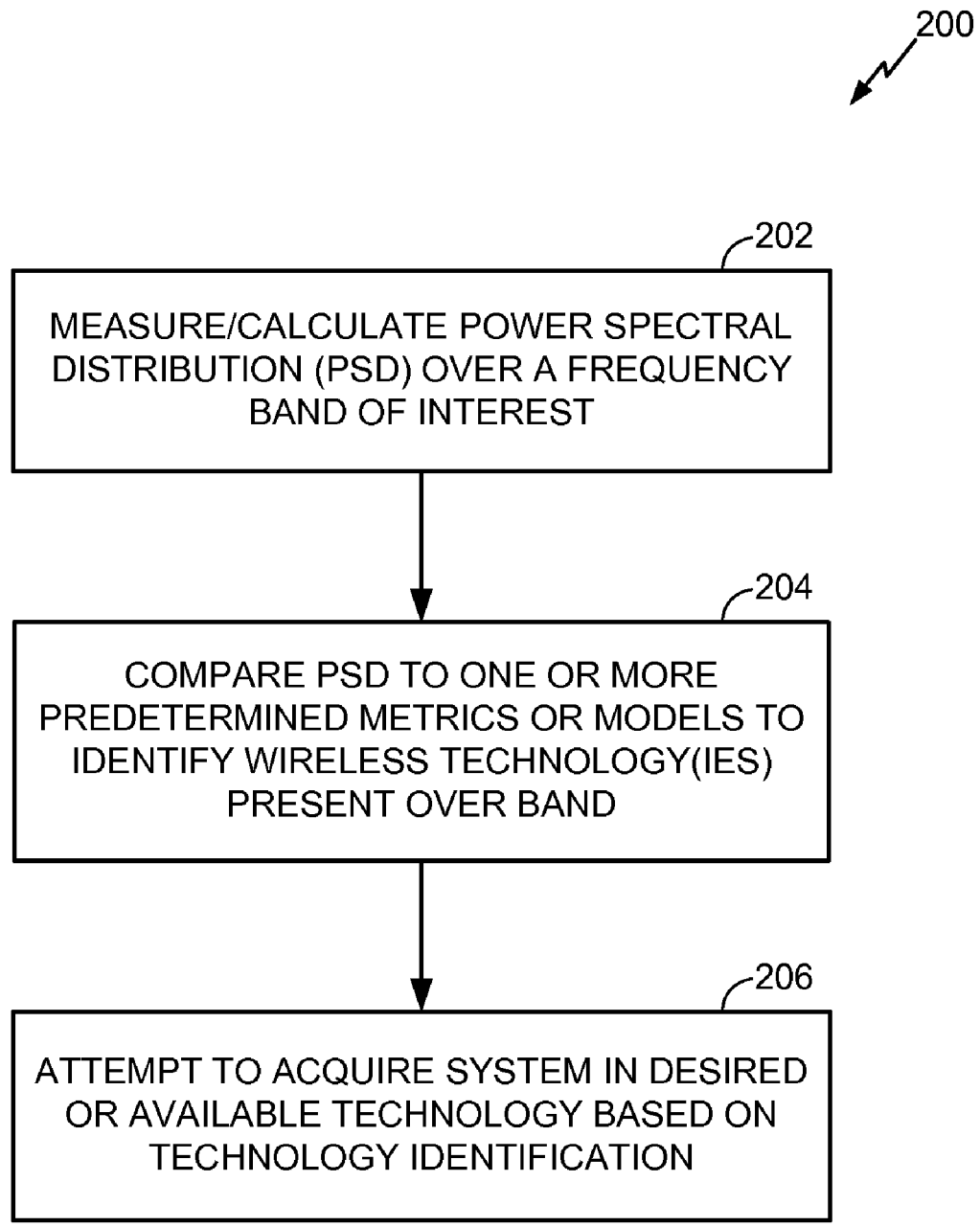
FIG. 2 is a flow chart illustrating an embodiment of a process for facilitating system acquisition in accordance with an exemplary embodiment.

FIG. 2 is a flow chart illustrating an embodiment of a process 200 for facilitating system acquisition in accordance with an exemplary embodiment. Process 200 is performed by a receiver in terminal 150. The process may provide a faster and/or more reliable system acquisition by terminal 150 in a "polluted" electromagnetic environment where signals of multiple technologies are propagating. Process 200 may be performed when terminal 150 is first powered on, or, while it is already in an idle state and registered with a base station in a selected technology ("camped" on a channel). The process is performed prior to a system acquisition attempt by terminal 150 (i.e., an attempt to establish communication in a dedicated or shared frequency channel), or, after a call or data session is dropped.

In step 202, the power spectral distribution (PSD) of electromagnetic energy incident upon the terminal is measured or calculated with measurement samples, over a frequency band of interest. The frequency band of interest may be one which is known a priori to carry signals of different wireless technologies. Examples of such multi-technology bands currently include the 1930-1990 MHz band ("PCS" downlink); and the 1805-1880 MHz band ("DCS" downlink), each of which is known to carry both GSM and WCDMA signals. The measured/calculated PSD may be stored in memory.

Next, in step 204, the measured PSD is compared to one or more predetermined metrics, technology models or spectral patterns to determine the wireless technology or technologies present over the band. Each metric may have a range of values associated with a particular technology.

Depending on the application, the comparison pattern matching can result in a judgment of the presence or absence of a single technology, or of multiple technologies, in various portions of the band. The comparison may also determine locations of the band in which one technology is received with stronger signal power than others, i.e., one technology dominates the others in signal power. This may be done by establishing a ranking for the various technologies based on the closeness of the measurements to the metrics/models.

Models and metrics may be provided for one or more of: bandwidth of discernible pulse-like shapes (hereafter, "pulses") in the spectrum; slopes of rising and/or falling edges of the pulses (which may be detected using derivatives); shape of the spectrum, such as the shape of a rising edge portion, falling edge portion, and/or centralized portion of a discernible pulse; dynamic range of the pulses (e.g., difference in power level at the pulse peak relative to noise level or levels adjacent the pulse); detection of a channel raster (i.e., separation between adjacent carriers); peak power location; and neighborhood/guard band metrics.

Other characteristics and associated metrics/models can include: peak to average power in a segment; autocorrelation characteristics; and detected carrier locations in which detected carriers are compared to estimated (predetermined) carriers to derive a bias in frequency estimation of the wireless terminal receiver (such as a bias due to its clock unit).

Additionally, the frequency domain metrics can be augmented with time domain metrics to establish a more elaborate technology ranking methodology. Time domain metrics can include: the detection of flickering (e.g., TDM signals as in the GSM protocol may be on or off for a specific traffic channel); Peak to Average Ratio (PAR) in the time domain; and time domain correlation to time profiles. It is also conceivable in some embodiments for the signal technology identification to be performed based on the time domain characteristics comparison/matching alone, i.e., without the frequency domain characteristics matching.

Once the presence, absence or dominance of a technology in specific locations over the frequency band is established in step 204, the remote terminal 150 uses this information in step 206 to facilitate system acquisition. For instance, terminal 150 can attempt to acquire a system in a given technology by scanning only those frequency channels where that technology was determined to be present (from step 204). Thus, by skipping channels where the technology is not present or is being dominated by another technology, a faster acquisition can be achieved. Alternatively, if terminal 150 has multi-technology capability, it can perform a channel scan whereby it first attempts (or exclusively attempts) to acquire a system on the dominant technology determined for each channel. This procedure will likewise speed up system acquisition in a polluted environment.

It is noted here that the steps in process 200 can be performed using either a complete sweep or piecemeal method; and parallel processing of the various steps may be performed in either of these methods. In the complete sweep method, the entire frequency band of interest is first measured in step 202 to establish the PSD over the entire band. Then in step 204, the PSD comparison/pattern matching is also performed over the whole band to arrive at a complete characterization of the band. Then, in the channel scanning operation of step 206, any candidate channel over the band can be selected with the knowledge of the technology being present or dominant. With the piecemeal method, only a portion of the frequency band of interest is measured for PSD in step 202; that portion is then evaluated for technologies in step 204, and if a desired technology is deemed to be sufficiently present in at least a predetermined number of channels in that frequency band portion, the channel acquisition procedure of 206 is commenced.

The power spectral distribution can be obtained in a number of ways in accordance with the disclosure. Considerations in selecting measurement options include the speed of the PSD measurement; frequency resolution; and dynamic range. As described, power spectrum in the frequency domain provides useful information regarding the underlying communication technology. For example, with current protocols, the GSM symbol rate is 271 kHz; the CDMA chip rate is 1.2288 MHz and the WCDMA chip rate is 3.84 MHz. Their respective bandwidths are approximately the same as their corresponding chip rates. Given a snapshot of the frequency band of interest, without any prior information and judging by the patterns of the power spectrum, it is possible to distinguish narrowband GSM signals from other wideband signals such as CDMA or WCDMA signals.

Figure 3:
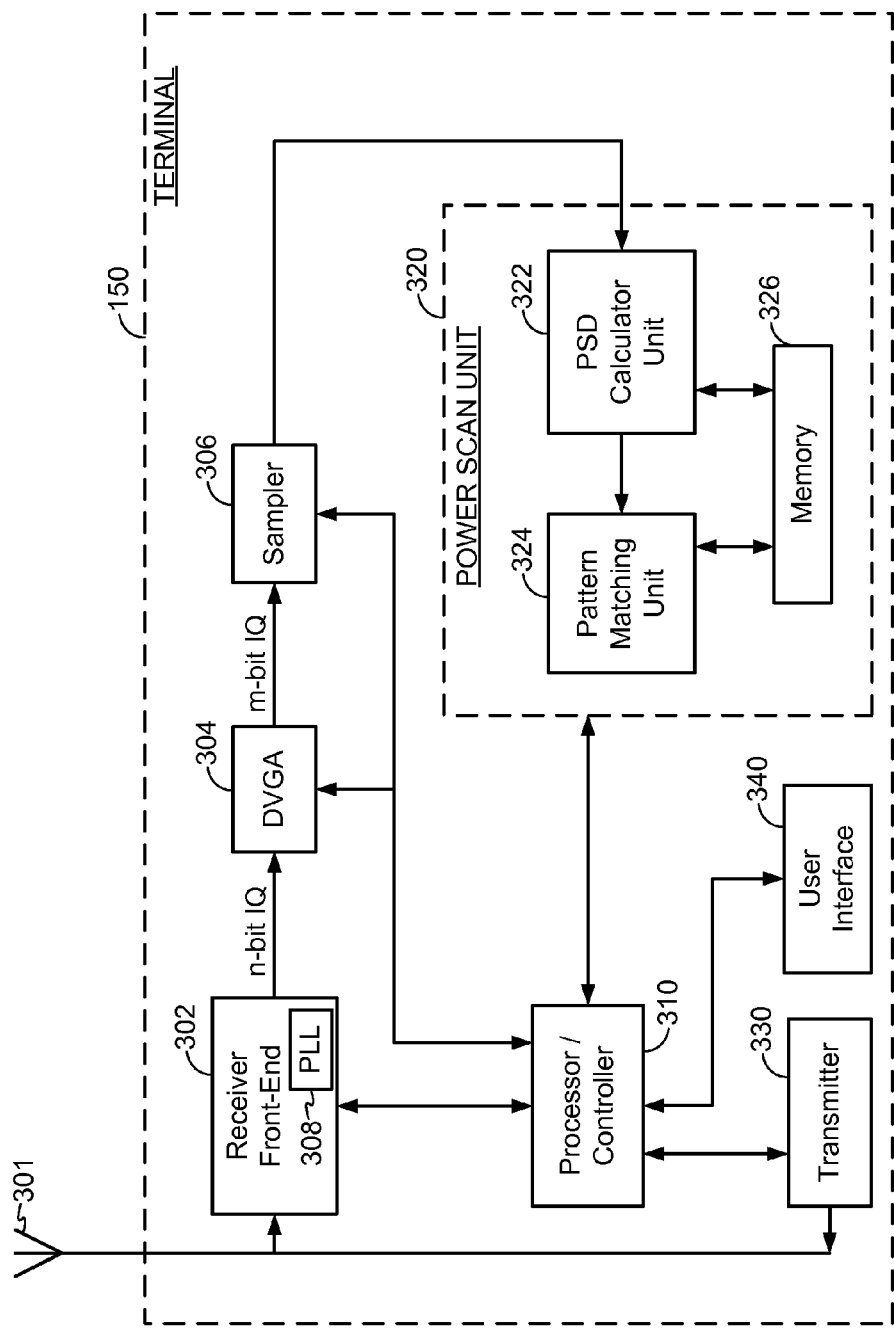
FIG. 3 is a block diagram of an exemplary embodiment of a remote terminal.

FIG. 3 is a block diagram of an exemplary embodiment of terminal 150. Terminal 150 employs circuitry for facilitating system acquisition. Referring to FIG. 3, receive signals are captured by antenna 301 and provided to receiver (RX) front end 302, which conditions (e.g., amplifies, RF demodulates, filters and downconverts) the signals. RX front end 302 is selectively tunable to frequencies, and otherwise performs receive and signal conditioning functions, under the control of processor/controller 310. Frequency tuning is accomplished with the use of phase lock loop (PLL) 308. Processor/controller 310 may provide all the processing and control commands for the various components of device 150, such as transmitting (TX) section 330, user interface 340, etc.

In the illustrated exemplary embodiment, RX front end 302 is embodied as a WCDMA front end, which provides a wider filter bandpass than either a GSM or CDMA implementation. The deployment of a wider filter bandpass can reduce the time expended on the power scan operation to identify signal types. For instance, it may be desirable to reduce the time to scan and process a 60 MHz band to a duration of less than around 200 ms, and possibly as low as 100 ms or less. A wider RX front allows the whole band to be covered with a relatively smaller number of re-tunings of the phase lock loop (PLL) 308 and corresponding settling of direct current (DC) and variable gain amplifier (VGA) within the automatic gain control (AGC) settling time. The exemplary embodiment utilizes a WCDMA RX front, which produces wchipx2 IQ samples at a reference frequency. If selected at twice the chip frequency of 3.84 MHz, the reference frequency is 7.68 MHz.

In operation, RX front end 302 provides n-bit IQ samples (e.g., n=18) to digital variable gain amplifier (DVGA) 304 at a chip rate higher than the WCDMA chip rate, e.g., at twice the chip rate (i.e., wchipx2). The DVGA 304 outputs the signal at m bits (where m is typically less than n, e.g., m=6) with a selected standard deviation (e.g., 12). The DVGA 304 output is sampled by sampler 306, with the samples then being provided to power scan unit 320, which employs a power scan technique or algorithm to analyze and identify the types of signal technologies (e.g., CDMA, WCDMA, GSM) at frequency locations across the band. Power scan unit 320 includes PSD calculator unit 322, pattern matching unit 324 (which may be implemented as an advanced risk machine (ARM)) and memory 326. While power scan unit 320 is shown as a separate entity from processor/controller 310, it can alternatively be implemented as part of processor/controller 310. PSD calculator unit 322 can be embodied as a multiprocessor digital signal processor block (MDSP). Portions or the entirety of each of the terminal 150 components 302, 304, 306, 308, 310, 320, 330 and 340 can be embodied as part of a common integrated circuit. While shown as separate entities for clarity of understanding, the various components or functions thereof may also be implemented as software running on processor/controller 310 or on independent processors of the respective components.

In operation, sampler 306 is capable of capturing the m-bit IQ samples, and direct memory accessing ("DMA'ing") the IQ samples to PSD calculator 322 and to memory 326. The Welch method or an equivalent is used in calculator 322 to calculate the power spectrum for each frequency segment power capture. Calculator 322 can perform windowing, fast fourier transforms and averaging. Pattern matching unit 324 performs pattern matching on the power spectrum processed by calculator 322 by comparing one or more characteristics, features or patterns of the PSD to metrics, models or patterns pre-stored in memory 326.

Terminal 150 can obtain the power spectrum in a number of ways. Design considerations include speed, frequency resolution and power dynamic range.

Figure 4:
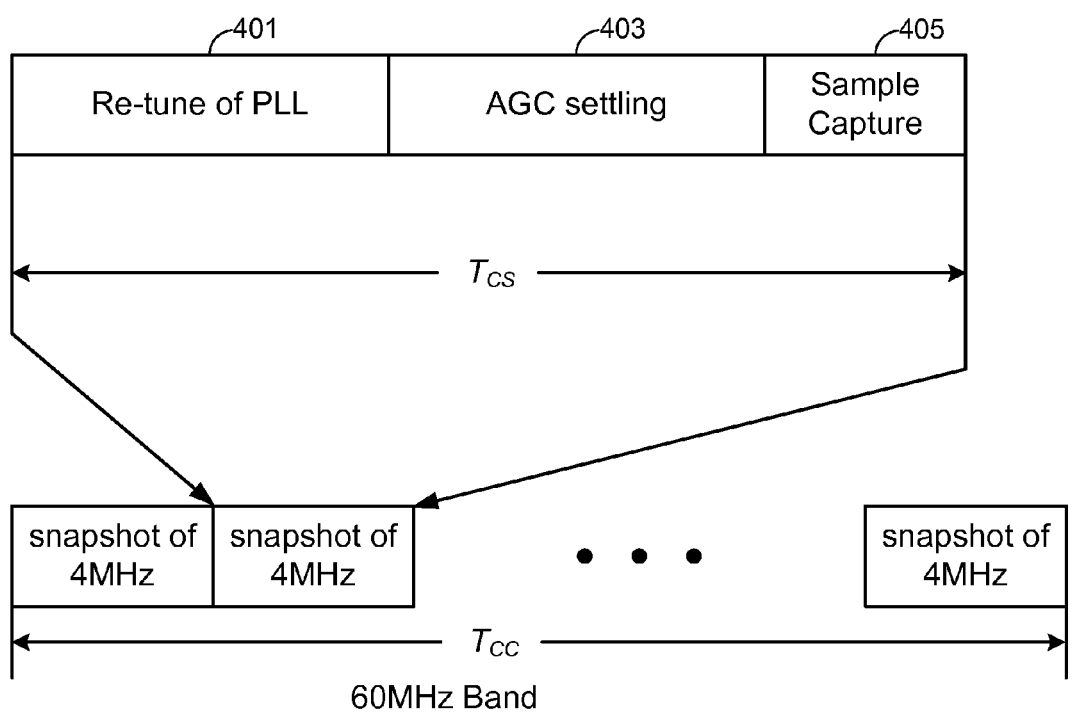
FIG. 4 is a capture timeline illustration exemplifying a suitable segmented power spectrum capture in accordance with an exemplary embodiment.

FIG. 4 is a capture timeline illustration exemplifying a suitable segmented power spectrum capture in accordance with an exemplary embodiment. In this example, it is desired to obtain a PSD of a 60 MHz wide band of interest, such as the 1930-1990 MHz band. In the band of interest, the terminal 150 may receive signals transmitted in accordance with different technologies. The spectrum is measured in contiguous segments across the band, e.g., in 4 MHz wide segments, to obtain the PSD of the 60 MHz band in 15 increments.

The time $T_{CC}$ expended to complete the capture for the entire band may be on the order of 15 ms, with a time $T_{CS}$ on the order of 1 ms to capture the PSD of each segment. These times are merely illustrative and are not critical to the disclosure. However, additional time is expended to move the captured data to the MDSP memory and for MDSP process time within power scan unit 320, which additional time may be on the order of 100 ms. Naturally, a fast overall speed is desirable for the data capture and analysis. In an embodiment, after the spectrum of a given segment is captured, the RX front end filter is re-tuned to capture the PSD of the next segment. The re-tuning may involve re-tuning the phase lock loop (PLL) 308 and awaiting a settling time of an automatic gain control (AGC) component (e.g., DVGA 304). In the example of FIG. 4, time interval 401 represents a PLL re-tuning time and time interval 403 represents the AGC settling time; time interval 401, 403 may each occupy one quarter to one third or more of the total PSD capture time for the segment. The actual sampling is performed in the last time interval 405 of the period.

It is understood that the numerical values in FIG. 4 are provided for illustrative purposes only, and that the segment widths (in units of frequency) and the corresponding sampling times can be selected at any suitable values. As mentioned above, it is generally desirable to reduce the number of segments to be concatenated in the overall frequency band of interest. That is, since the PLL re-tuning and AGC settling time occur in each segment scan, a larger number of segment scans for a given overall frequency band of interest will take longer to scan overall. However, the segment width may be limited by the receiver front end filter—the narrower the filter bandpass, the narrower the segment width. Thus, if the terminal 150 is configured to allow a RX active filter selection (as in a multi-mode terminal), a widest front end filter should be selected. The central, flat portion of the relatively wider WCDMA bandpass filter suitable for spectral measurement may be around 4 MHz, which is the basis for the example of FIG. 4.

In addition, the frequency resolution should be high enough to provide sufficient detail in the frequency domain for a subsequent pattern matching operation. This is especially the case for GSM signals, which exhibit a narrowband spectral waveform. If the resolution is too low, the narrowband signal may not be detected reliably, or may escape detection altogether. A finer resolution will help reveal the spectrum shape, but typically requires more IQ samples and a longer processing time. For instance, if a 128-point FFT is used, a resolution of $F_{RES}=(2\times 3.84 \text{ MHz})/128=60$ kHz is achievable (where 3.84 MHz is a WCDMA chip rate for pseudorandom coding). Such a resolution usually provides four to five points in the frequency domain for GSM signals.

The dynamic range of the power spectrum for the whole band may be significant, with power ranging from levels of −25 dBm down to −110 dBm. Due to the limited number of capture bits available (typically 6 or 8 bits), each capture can only provide a limited dynamic range. As such, signals at low power levels may be overwhelmed by signals at high levels nearby within one capture.

Figure 5:
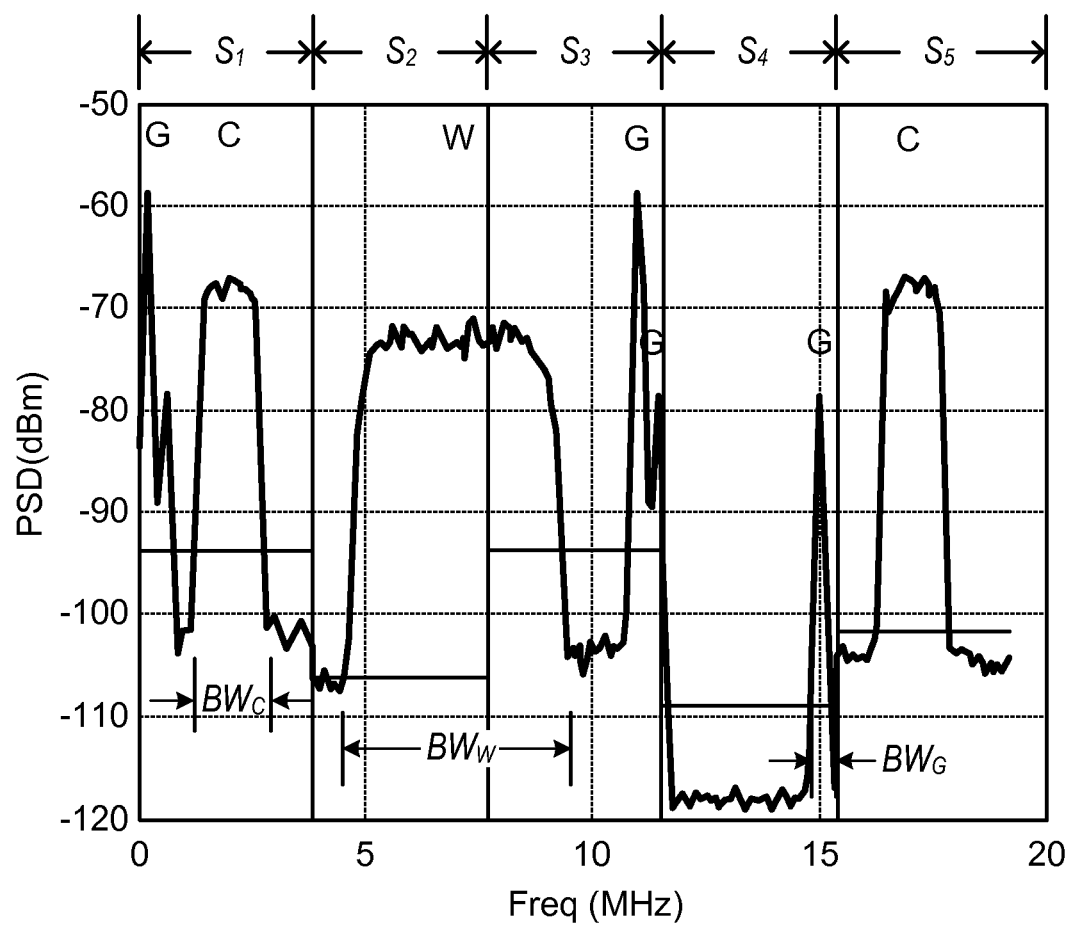
FIG. 5 is an example graph of a concatenated power spectral distribution (PSD) of a PCS band captured by a remote terminal.

FIG. 5 is an example graph of a concatenated power spectral distribution of a PCS band captured by remote terminal 150. Five snapshots $S_1$-$S_5$ are concatenated together to cover a 20 MHz portion of a band of interest. Due to the various setting points of the DVGA 304, each snapshot manifests different quantization noise levels. The details revealed by this power spectrum can differentiate between narrowband GSM signals, wider band CDMA and still wider band WCDMA signals. In this example, multiple pulses or pulse-like waveforms are apparent across the 20 MHz span. If the spectrum is not too noisy, a bandwidth of each pulse can be discerned with reasonable accuracy. In the figure, bandwidths $BW_W$, $BW_C$ and $BW_G$ are visually observed for pulses labeled W, C and G, respectively. These correspond to an identification of respective WCDMA, CDMA and GSM signals. Power scan unit 320 discerns the presence of the pulses and calculates the bandwidth values thereof. As a first order metric, each technology type can be expected to appear as a spectral pulse having a bandwidth within a predetermined tolerance, with WCDMA having the widest bandwidth and GSM the narrowest.

It is noted here that multi-path fading is a variation of attenuation that a carrier signal experiences across a transmission medium. Since fading can have a significant impact on the spectrum of a wideband signal, it is desirable for a PSD pattern matching technique to be robust to fading. Fading may vary with time, location and carrier frequency.

Figure 6:
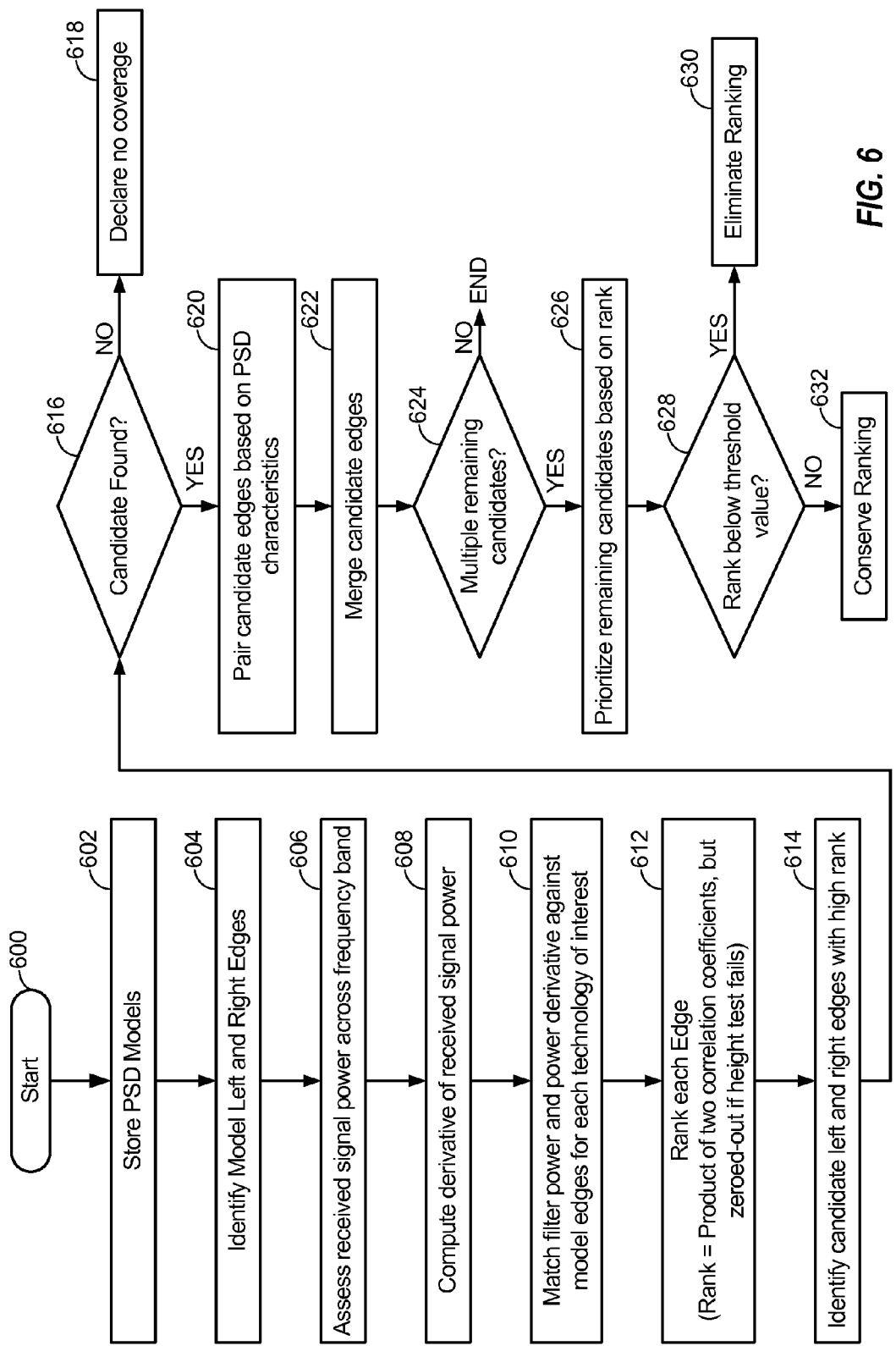
FIG. 6 is a flow chart of a pattern matching power scan procedure for searching for signals of predetermined technologies in accordance with an exemplary embodiment.

FIG. 6 is a flow chart of a pattern matching power scan procedure for searching for signals of predetermined technologies in accordance with exemplary embodiment. The pattern matching power scan procedure may be implemented for example by power scan unit 320. The flow starts in step 600. In step 602, PSD models are stored in local memory.

Figure 7:
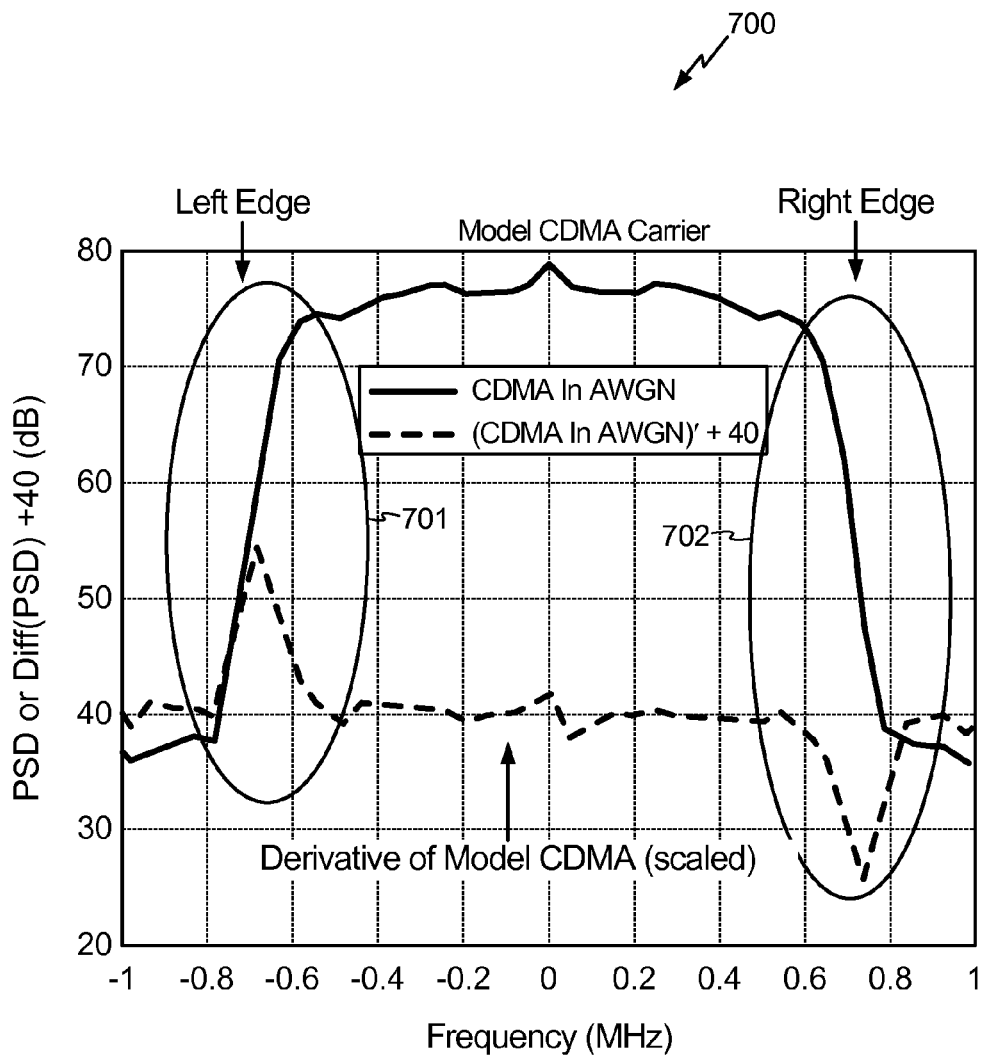
FIG. 7 is a graph depicting an example PSD model of a CDMA signal in accordance with an exemplary embodiment.

FIG. 7 is a graph depicting an example PSD model 700 of a CDMA signal in accordance with an exemplary embodiment. PSD model 700 may comprise PSD values in decibels, PSD derivative values, and the like. PSD model 700 is shown characterized by a left (rising) edge 701 and right (falling) edge 702. Model 700 may optionally be characterized in terms of the pulse attributes of a centralized portion thereof such as degree of flatness, smoothness and/or roundness.

A rising or falling edge can be further characterized by a guard band portion (if the edge is adjacent to a guard band), a central sloping portion, and a shoulder portion. The left and right edge models may include ranges and duration of slopes (derivatives), shapes of shoulders, and shapes of early rising transitions from the adjacent level or noise level for the rising edge (e.g., the shapes within a guard band on the rising edge side), shapes of late falling transitions for the falling edges (such as within a guard band on the falling edge side). In step 604 the left and right edges of the models are identified. In step 606 received signal power across the frequency band of interest is assessed. In step 608 the derivative of the received signal power is computed. In step 61, the calculated derivative from step 608 is match filtered against PSD model edges for each technology of interest. In step 612 each edge is ranked. The rank of each edge is equal to the product of two correlation coefficients, but zeroed-out (discarded) if a height test fails. That is, if the rising (left) edge does not rise by at least a threshold amount of power, i.e., by a threshold height, the discerned edge is not considered relevant. Mathematically, the height test is satisfied if the product of the two correlation coefficients are above a predefined threshold.

In step 614 candidate left and right edges with high ranking are identified. In step 616 a check is performed as to whether any candidates with high ranking were found. If no candidates were found then no coverage is declared. That is, the process determines that no suitable signal types have been discerned in the band segment under analysis. If, on the other hand, candidates were found, then step 620 is executed. In step 620 candidate edges are paired based on PSD characteristics described herein. In step 622 candidate edges are merged together (i.e., considered part of the same edge) if they share an edge location, are closely spaced in frequency, or have the highest overall rank. In step 624, a check is performed as to whether there are multiple remaining candidates. If not, then the flow stops because there is no need to create a list of rankings. If there are multiple remaining candidates then step 626 is executed, where the remaining candidates are prioritized based on rank. In step 628, a check is performed as to whether the rank of the remaining candidates is below a threshold value. If yes, then the ranking is eliminated in step 630. If not, then the ranking is conserved in step 632.

Figure 8:
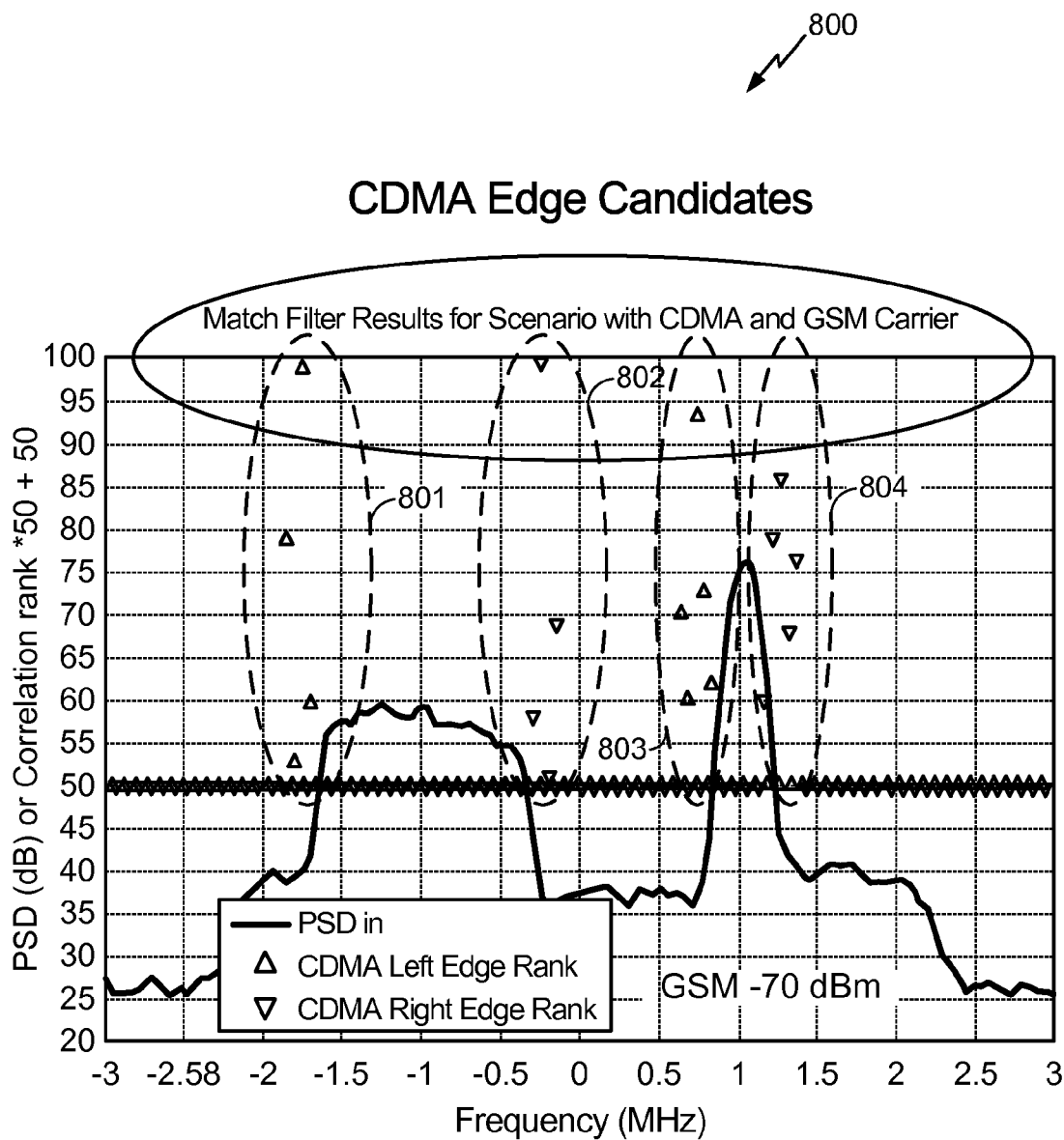
FIG. 8 is a graph illustrating operation of the pattern matching power scan procedure upon signals within a 6 MHz wide portion of a frequency band of interest.

FIG. 8 is a graph illustrating operation of the pattern matching power scan procedure upon signals within a 6 MHz wide portion of a frequency band of interest. Within the spectrum, a CDMA carrier is centered at about −1 MHz and a GSM carrier is centered at about +1 MHz from the band center. The triangular data points represent results for a CDMA match filter computation within pattern matching unit 324 of FIG. 3 and using the process described in connection with FIG. 6. That is, the calculation in this example is specifically tailored to detect CDMA edges. Each upwardly pointing triangle represents a correlation result at a unique frequency for a rising edge of a pulse shaped waveform in the spectrum, while each downwardly pointing triangle signifies a correlation result for a falling edge of the pulse. Data points having correlation less than 50% are simply shown at the 50% level. It is seen that the highest correlation data point among the data points within ovals 801 and 802 rises to nearly 100%, strongly indicating the presence of a CDMA edge at the frequency of that data point. However, within ovals 803 and 804, the highest correlation rises to around 94% and 86%, respectively, which indicates the presence of signal edges, but not necessarily CDMA edges. Considering the close frequency spacing between ovals 803 and 804 containing oppositely directing triangles, this indicates the presence of the narrowband GSM signal at that location in the spectrum.

Note also that instead of, or in addition to, analyzing and correlating the left and/or right edges of the respective pulses, the shapes of the centralized portions of the pulses can be analyzed and compared to models for the centralized portions to arrive at a similar result. Further, the left and right edge analysis can include a shape analysis as opposed to a strict derivative (slope) analysis, such as a modeling of the roundness of the left and right edge shoulders for each technology of interest, and a pattern analysis to compare the measured roundness to the models for the various technologies.

As described hereinabove, the power scan procedure may generally be described as a two step process. The first step is to obtain a snapshot of the spectrum of the band of interest. This involves taking In-phase and Quadrature (IQ) samples from the receiver (RX) front using the widest possible technology, which in the exemplary embodiment is WCDMA, about 4 MHz wide, and applying the Welch or equivalent method to compute the signal spectrum. To cover an entire band of interest, a plurality of such spectra are concatenated.

The second step is to apply PSD characteristic comparison to metric(s) or pattern matching. Various signatures of the technologies can be considered to facilitate pattern matching. In the frequency domain, the most important signature in some embodiments may be considered bandwidth of the signal. Other characteristic information such as noise floor, neighborhood and the steepness of the edges can be utilized to establish rankings of the various technologies based on technology likelihood estimates. The power scan unit 320 may further measure and compare a peak to average power characteristic in a segment; autocorrelation coefficients; and detected carrier locations to add further parameters to the ranking operation. In the time domain, the TDMA nature of the GSM signal and the small peak-to-average ratio of GSM can be used to distinguish a GSM signal from other types. The pattern matching algorithm should be robust to fading in order to work reliably in the field. At the end of the second step, an ordered list of potential channels for each technology is generated. This list can be used to speed up the normal acquisition time and avoid wasting time and power on irrelevant blocks of the band.

There are various techniques to detect the underlying technologies. For example, within the frequency domain, the following power spectral density characteristics may be utilized to determine the underlying technology being received: Bandwidth, Channel raster, Peak power location, Neighborhood and Guard band, Spectrum shape and Edge matching. Further, in the time domain, the following power spectral density characteristics may be utilized to determine the underlying technology being received: Flickering (when a GSM signal toggles on or off in a specific traffic channel), Peak-to-Average Ratio (PAR) and Correlation in the time domain.

The bandwidth in the frequency domain is inversely proportional to the span of the pulse shaping function in the time domain. This is evident in power spectrum. By standards, GSM and WCDMA follow a channel raster of 200 kHz for all bands. CDMA follows various channel rasters: 30 Khz for US CELL band and 50 kHz for US PCS band. Channel raster serves as prior information, which can greatly enhance the accuracy of pattern matching.

Since all radio resources are allocated in blocks with guard band to avoid adjacent interference, signals nearby in one neighborhood should belong to the same technology. For example, if several strong GSM signals are detected in one block, it is less likely to find any CDMA or WCDMA channels in that area, and vice versa. Due to the raised root cosine (RRC) pulse shaping waveform, WCDMA signal has a slow falling edge in comparison with CDMA. This provides another clue to distinguish a WCDMA signal from a CDMA signal.

Special techniques can be employed to discern GSM signals from a measured PSD. GSM is a TDMA system. That is, GSM assigns different users different slices of time to send and receive information, thus allocating the available spectrum between multiple users based upon time. The GSM traffic channel may toggle on and off. If such behavior is detected, the target channel is most likely a GSM channel. A GSM signal has relatively low PAR compared to CDMA and WCDMA signals, even in fading situations, due to the constant envelope modulation used in GSM. This low PAR may be used to further verify candidate GSM channels before a full acquisition is initialized.

Figure 9:
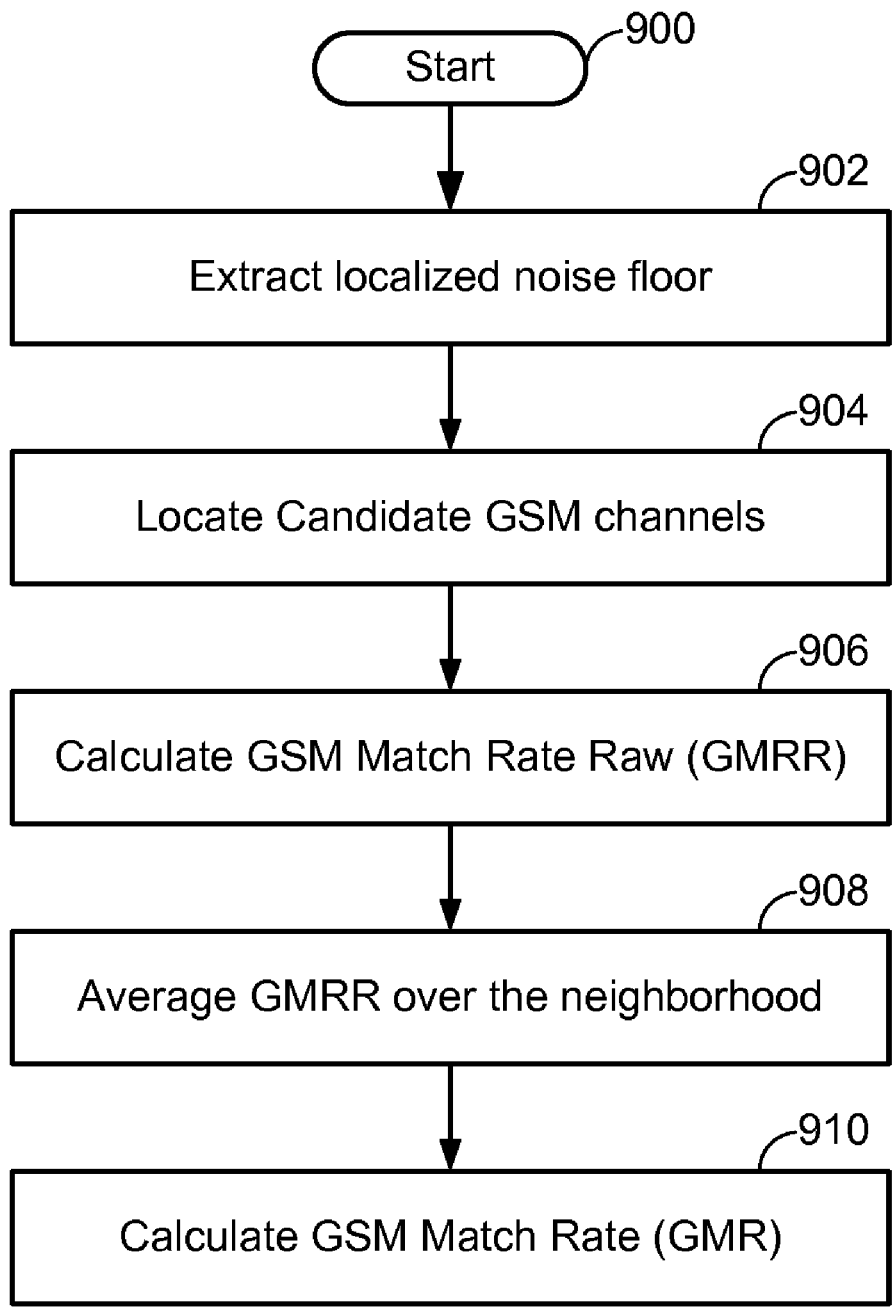
FIG. 9 is a flow chart illustrating a GSM Match Rate (GMR) power scan procedure to search for GSM signals in accordance with an exemplary embodiment.

FIG. 9 is a flow chart illustrating a GSM Match Rate (GMR) power scan procedure to search for GSM signals in accordance with an exemplary embodiment. GSM Match Rate (GMR) coherently combines multiple steps. Starting from a known PSD, each step brings in additional information to help identify GSM channels. A metric table or matrix may be created to record all the intermediate and final results. A 60 MHz band can contain up to 120 channels because GSM channels have a raster of 200 kHz. Multiple metrics of interest may be recorded, such as GMR, edge matching rate and PAR.

The flow starts in step 900. The first step 902 is to extract the localized noise floor. This is necessary to compensate for the variation in the digital variable gain amplifier (DVGA) settings across different spectrum snapshots. The localized noise floor should be the maximum of the quantization noise floor, deduced from the DVGA setting and the RF thermal noise floor. The second step 904 is to locate candidate GSM channels. A candidate GSM channel has both a higher power than a programmable threshold above the localized noise floor and a power peak within a 200 kHz channel span centered at valid GSM channel raster. This step uses information of channel raster and power. Rough spectrum shape information is also integrated because the peak is required to occur within a 200 kHz channel span. In the third step 906 GSM Match Rate Raw (GMRR) is calculated. First, one may assume that the power of candidate channel is P(n). For a 60 kHz resolution, P(n) with decent power will have N=4 points in the frequency domain, with a range of power that may be expressed as follows:

$$P_{range} = \max(P) - \min(P) \quad \text{Eq. (1)}$$

A GSM power template Pref(n) is first calculated with the same center and power level as P(n). The absolute power difference at each point may be expressed as follows:

$$P_{diff}(n) = \text{abs}(P(n) - P_{ref}(n)) \quad \text{Eq. (2)}$$

GMRR then may be expressed as follows:

$$GMRR = N - \frac{\sum_{n=1}^{N} P_{diff}(n)}{P_{range}} \quad \text{Eq. (3)}$$

GMRR is always less than N. When a good match is utilized, a larger N typically yields a larger GMRR. A reduction in $P_{range}$ results in a reduced GMRR value. This resulting reduction in calculated GMRR is a useful feature to distinguish between narrowband GSM signals and wideband CDMA and WCDMA signals.

In the fourth step 908, GMRR is averaged over the neighborhood to derive GSM Match Rate Normalized (GMRN)

$$GMRN = \frac{\sum_{m=1}^{M} GMRR(m)}{\sum_{m=1}^{M} N(m)} \quad \text{Eq. (4)}$$

GMRN is always less than 1, but could be a large negative value when $P_{range}$ is small. GMRN may frequently exceed a value of 0.8. GMRN may also be a very stable quantity. For CDMA and WCDMA neighborhoods, GMRN is frequently less than −1.

A threshold set between 0 and 0.3 can easily separate GSM neighborhood from other signals. Both CDMA and WCDMA signals may generate some large GMRR values, however, when averaging over the corresponding neighborhood, GMRN becomes negative due to some very large negative GMRRs.

In the fifth step 910, GSM Match Rate (GMR) is calculated. The GMR value may be expressed as follows:

$$GMR = \begin{cases} GMRR & \text{GSM neighborhood} \\ 0 & \text{Other neighborhood} \\ -1 & \text{non-candidate channel} \end{cases} \quad \text{Eq. (5)}$$

That is, GMR is equal to GMRR when searching within the GSM neighborhood, equal to zero when searching within other neighborhoods and equal to negative one when searching within non-candidate channels. GMR may provide the ability to distinguish GSM (0-6 MHz) from WCDMA (9-13 MHz) and CDMA (16-18 MHz), while providing a strong match rate for any valid GSM channel. Channels with positive GMR may be ordered and serve as candidates for GSM acquisition. Any neighborhood identified as GSM should be excluded from the acquisition list of CDMA and WCDMA searches.

Accordingly, as described, embodiments of power scan unit 320 may be configured to measure a PSD of received signals within a segment of a frequency band of interest, and to compare detected carrier frequencies within the PSD to a set of predetermined carrier frequencies, to derive a bias in frequency estimation of the wireless terminal, such as a bias due to the terminal's clock unit. The bias can be equal to a difference between the detected and predetermined carrier frequencies. Alternatively, the bias can be equal to a difference between the detected and predetermined carriers for a most likely carrier of a particular communication type. As a further alternative, the bias can be equal to a difference between the detected and predetermined carriers for a strongest carrier of a particular communication technology type.

Methods and devices employing power scan techniques described herein may be utilized to assist fast acquisition for various technologies. By leveraging the capability of commonly available receiver hardware, power scan algorithms may enable UEs to collect wireless information regarding a frequency band of interest within a fraction of a second. Assisted with intelligent frequency and time domain pattern recognition, UTs can make smarter decisions as to which radio technologies should be searched for first based upon the ranked likelihood of the underlying technology.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another.

A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for receiving communication signals, the device comprising:
    a power scan unit configured to:
        generate an aggregated power spectral distribution (PSD), wherein the aggregated PSD includes multiple PSDs that each correspond to a different sub-band of a frequency band of a received signal; and
        evaluate at least one characteristic of the aggregated PSD to identify a component of the received signal having a technology type;
        evaluate one or more additional characteristics of the aggregated PSD to identify one or more additional components of the received signal, at least one of the one or more additional components having a second technology type that is different than the technology type; and
    a controller configured to perform a system acquisition operation in accordance with the technology type.
2. The device of claim 1, wherein the at least one characteristic of the aggregated PSD comprises at least one of a shape of a rising edge portion of a pulse-like waveform or a shape of a falling edge portion of a pulse-like waveform.

3. The device of claim 2, wherein the shape of the rising edge portion includes a shape of one or more of a guard band portion, a central sloping portion or a shoulder portion of the rising edge portion, and wherein the shape of the falling edge portion includes a shape of one or more of a shoulder portion, a central sloping portion, or a guard band portion of the falling edge portion.

4. The device of claim 1, wherein the at least one characteristic of the aggregated PSD comprises a shape of a centralized portion of a pulse-like waveform.

5. The device of claim 1, wherein evaluating the at least one characteristic of the aggregated PSD includes comparing the at least one characteristic of the aggregated PSD to at least one metric, wherein the comparison includes a comparison of a pattern of the aggregated PSD to a model pattern via a match filter operation.

6. The device of claim 1, further comprising means for deriving a time profile of the received signal and comparing the derived time profile to an expected time profile to further identify the component of the received signal having the technology type.

7. The device of claim 1, wherein the system acquisition operation extracts the component of the received signal.

8. The device of claim 1, wherein the controller is further configured to perform another system acquisition operation in accordance with the second technology type.

9. The device of claim 1, wherein the component has a first frequency profile at a first location within the frequency band and at least one of the one or more additional components has a second frequency profile at a second location within the frequency band.

10. The device of claim 9, wherein the first location corresponds to a first set of sub-bands of the frequency band and the second location corresponds to a second set of sub-bands of the frequency band.

11. The device of claim 1, wherein the component has a frequency profile that crosses at least one boundary between two adjacent sub-bands of the frequency band.

12. The device of claim 1, wherein the sub-bands of the frequency band of are contiguous sub-bands.

13. The device of claim 1, wherein generating the aggregated PSD includes concatenating the multiple PSDs.

14. The device of claim 1, wherein the power scan unit is further configured to identify the presence or absence of the technology type of the received signal by comparing the at least one characteristic to at least one metric.

15. A device for receiving communication signals, the device comprising:
    means for generating an aggregated power spectral distribution (PSD), wherein the aggregated PSD includes multiple PSDs that each correspond to a different sub-band of a frequency band of a received signal;
    means for evaluating at least one characteristic of the aggregated PSD to identify a component of the received signal having a technology type;
    means for evaluating one or more additional characteristics of the aggregated PSD to identify one or more additional components of the received signal, at least one of the one or more additional components having a second technology type that is different than the technology type; and
    means for performing a system acquisition operation in accordance with the technology type.

16. A method for use in a remote terminal in a wireless communications system, the method comprising:

generating an aggregated power spectral distribution (PSD), wherein the aggregated PSD includes multiple PSDs that each correspond to a different sub-band of a frequency band of a received signal;

evaluating at least one characteristic of the aggregated PSD to identify a component of the received signal having a technology type;

evaluating one or more additional characteristics of the aggregated PSD to identify one or more additional components of the received signal, at least one of the one or more additional components having a second technology type that is different than the technology type; and performing a system acquisition operation in accordance with the technology type.

17. The method of claim 16, wherein the at least one characteristic of the aggregated PSD comprises at least one of a shape of a rising edge portion of a pulse-like waveform or a shape of a falling edge portion of the pulse-like waveform.

18. The method of claim 16, wherein the at least one characteristic of the aggregated PSD comprises a shape of a centralized portion of a pulse-like waveform.

19. A device for receiving communication signals of at least one predetermined technology type, the device comprising:

means for generating an aggregated power spectral distribution (PSD), wherein the aggregated PSD includes multiple sequentially measured PSDs that each correspond to a particular sub-band of multiple contiguous sub-bands of a frequency band of a received signal;

means for evaluating at least one characteristic of the aggregated PSD to identify a component of the received signal having a technology type;

means for evaluating one or more additional characteristics of the aggregated PSD to identify one or more additional components of the received signal, at least one of the one or more additional components having a second technology type that is different than the technology type; and means for performing a system acquisition operation in accordance with the technology type.

20. The device of claim 19, wherein a comparison of the at least one characteristic of the aggregated PSD to a respective predetermined metric is used to establish a ranking of a plurality of technologies based on technology likelihood estimates, and wherein the identification of the component of the received signal having the technology type is based on the ranking.

21. A method for use in a remote terminal in a wireless communications system, the method comprising:

generating an aggregated power spectral distribution (PSD), wherein the aggregated PSD includes multiple sequentially measured PSDs that each correspond to a particular sub-band of multiple contiguous sub-bands of a frequency band of a received signal;

evaluating at least one characteristic of the aggregated PSD to identify a component of the received signal having a technology type;

evaluating one or more additional characteristics of the aggregated PSD to identify one or more additional components of the received signal, at least one of the one or more additional components having a second technology type that is different than the technology type; and performing a system acquisition operation in accordance with the technology type.

22. The method of claim 21, wherein the at least one characteristic of the aggregated PSD comprises at least one of a shape of a rising edge portion of a pulse-like waveform or a shape of a falling edge portion of the pulse-like waveform.

23. The method of claim 22, wherein the shape of the rising edge portion includes a shape of one or more of a guard band portion, a central sloping portion or a shoulder portion of the rising edge portion, and wherein the shape of the falling edge portion includes a shape of one or more of a shoulder portion, a central sloping portion, or a guard band portion of the falling edge portion.

24. The method of claim 21, wherein the at least one characteristic of the aggregated PSD comprises a shape of a centralized portion of a pulse-like waveform.

25. The method of claim 21, wherein evaluating the at least one characteristic of the aggregated PSD includes comparing the at least one characteristic of the aggregated PSD to at least one metric, wherein the at least one metric comprises a range of a bandwidth of a pulse-like waveform.

26. The method of claim 21, wherein the at least one characteristic of the aggregated PSD is compared to a plurality of metrics, wherein each metric of the plurality of metrics corresponds to a particular technology type, and wherein particular components of the received signal that correspond to different technology types are identified based on the comparison.

27. The method of claim 21, wherein generating the aggregated PSD comprises calculating a PSD using a Welch method for each sub-band of the frequency band.

28. The method of claim 21, wherein performing the system acquisition operation comprises initiating a search for an available channel in a location of the frequency band where the component has been identified.

29. The method of claim 28, wherein performing the system acquisition operation further includes initiating an attempt to acquire a channel in accordance with the component in a location of the frequency band where the absence of a second component of the received signal having a different technology type has been identified.

30. The method of claim 28, further comprising:
detecting at least one time domain feature of the received signal; and
identifying the component of the received signal having the technology type in accordance with both the at least one characteristic of the aggregated PSD and the detected time domain feature.

31. The method of claim 30, wherein detecting the at least one time domain feature includes detecting a flickering of the received signal to indicate the presence of a Time Domain Multiplexed (TDM) signal.

32. The method of claim 30, wherein detecting the at least one time domain feature includes detecting a correlation of a peak to average ratio (PAR) to a predefined metric.

33. A non-transitory computer program product including instructions for causing a remote terminal to:

generate an aggregated power spectral distribution (PSD), wherein the aggregated PSD includes multiple PSDs that each correspond to a different sub-band of a frequency band of a received signal;

evaluate at least one characteristic of the aggregated PSD to identify a component of the received signal having a technology type;

evaluate one or more additional characteristics of the aggregated PSD to identify one or more additional components of the received signal, at least one of the one or more additional components having a second technology type that is different than the technology type; and perform a system acquisition operation in accordance with the technology type.

34. A device for receiving communication signals of at least one predetermined technology type, the device comprising:
a power scan unit configured to:
measure a power spectral distribution (PSD) of received signals within a segment of a frequency band of interest; and
compare a peak to average power characteristic of the measured PSD to at least one predetermined metric to identify the presence or absence of at least one technology type of the received signals in the segment;
a controller configured to perform a system acquisition operation in accordance with the identification; and
a radio-frequency (RF) front end configured to band-pass filter the communication signals to a band-pass region having a width commensurate with a technology type of interest, wherein the peak to average comparison is performed within the band-pass region.

35. A device for receiving communication signals of at least one predetermined technology type, the device comprising:
a power scan unit configured to:
measure a power spectral distribution (PSD) of received signals within a segment of a frequency band of interest; and
compare an autocorrelation characteristic of the measured PSD to at least one predetermined metric to identify the presence or absence of at least one technology type of the received signals in the segment;
a controller configured to perform a system acquisition operation in accordance with the identification; and
a radio-frequency (RF) front end configured to band-pass filter the communications signals to a band-pass region having a width commensurate with a technology type of interest, wherein the autocorrelation characteristic comparison is performed within the band-pass region.

36. A device for use in a wireless receiver, the device comprising:
a power scan unit configured to:
measure a power spectral distribution (PSD) of received signals within a segment of a frequency band of interest; and
compare detected carrier frequencies within the PSD to a set of predetermined carrier frequencies to derive a bias in a frequency estimation of the wireless receiver;
wherein the bias is equal to a difference between the detected carrier frequencies and the set of predetermined carrier frequencies and wherein the difference corresponds to a mean difference between the detected carrier frequencies and the set of predetermined carrier frequencies.

37. The device of claim 36, wherein the set of predetermined carrier frequencies corresponds to a most likely carrier of a particular communication technology type.

38. The device of claim 36, wherein the set of predetermined carrier frequencies corresponds to a strongest carrier of a particular communication technology type.

* * * * *